United States Patent [19]

Stumpf

[11] 4,401,501
[45] Aug. 30, 1983

[54] APPARATUS FOR MAKING ASSEMBLIES OF POCKETED SPRINGS

[75] Inventor: Walter Stumpf, Dunwoody, Ga.

[73] Assignee: Simmons USA Corporation, Atlanta, Ga.

[21] Appl. No.: 343,892

[22] Filed: Jan. 29, 1982

Related U.S. Application Data

[63] Continuation-in-part of Ser. No. 242,678, Mar. 11, 1981, abandoned.

[51] Int. Cl.³ .................... B23K 19/04; B29C 27/08; B30B 15/16
[52] U.S. Cl. ................... 156/367; 156/182; 156/558; 156/559; 156/580.1; 156/583.1; 228/1 B
[58] Field of Search ............ 156/73.1, 182, 292, 156/383, 553, 558, 559, 580.1, 580.2, 583.1, 583.91, 367; 5/477; 53/114; 228/1 R, 1 B

[56] References Cited

U.S. PATENT DOCUMENTS

| 1,677,232 | 7/1928 | Gail | 5/477 |
|---|---|---|---|
| 2,805,429 | 9/1957 | Woller | 5/477 |
| 3,168,792 | 2/1965 | Stumpf | 29/433 |
| 3,230,558 | 1/1966 | Duncan | 5/477 |
| 3,576,690 | 4/1971 | Staats et al. | 156/73.1 |
| 3,830,524 | 8/1974 | Abildgaard et al. | 156/73.1 |
| 4,234,983 | 11/1980 | Stumpf | 5/477 |
| 4,234,984 | 11/1980 | Stumpf | 5/477 |
| 4,333,779 | 6/1982 | Rinker et al. | 156/73.1 |

FOREIGN PATENT DOCUMENTS 1085597  4/1978  Canada .

Primary Examiner—Michael G. Wityshyn
Attorney, Agent, or Firm—Fitch, Even, Tabin & Flannery

[57] ABSTRACT

The subject apparatus assemblies strips of pocketed upholstery springs, one strip at a time, into spring cores for mattresses and the like.

The connections of each such strip to its predecessor are made between the interpocket webs of the pocket sheeting of the two adjacent strips, preferably at intervals of two springs, and are staggered by one spring from strip to strip.

The disclosed and preferred technique for joining the pocket material of the adjacent strips is thermal welding by ultrasonic vibration, but other specific forms of connection are also suggested.

9 Claims, 20 Drawing Figures

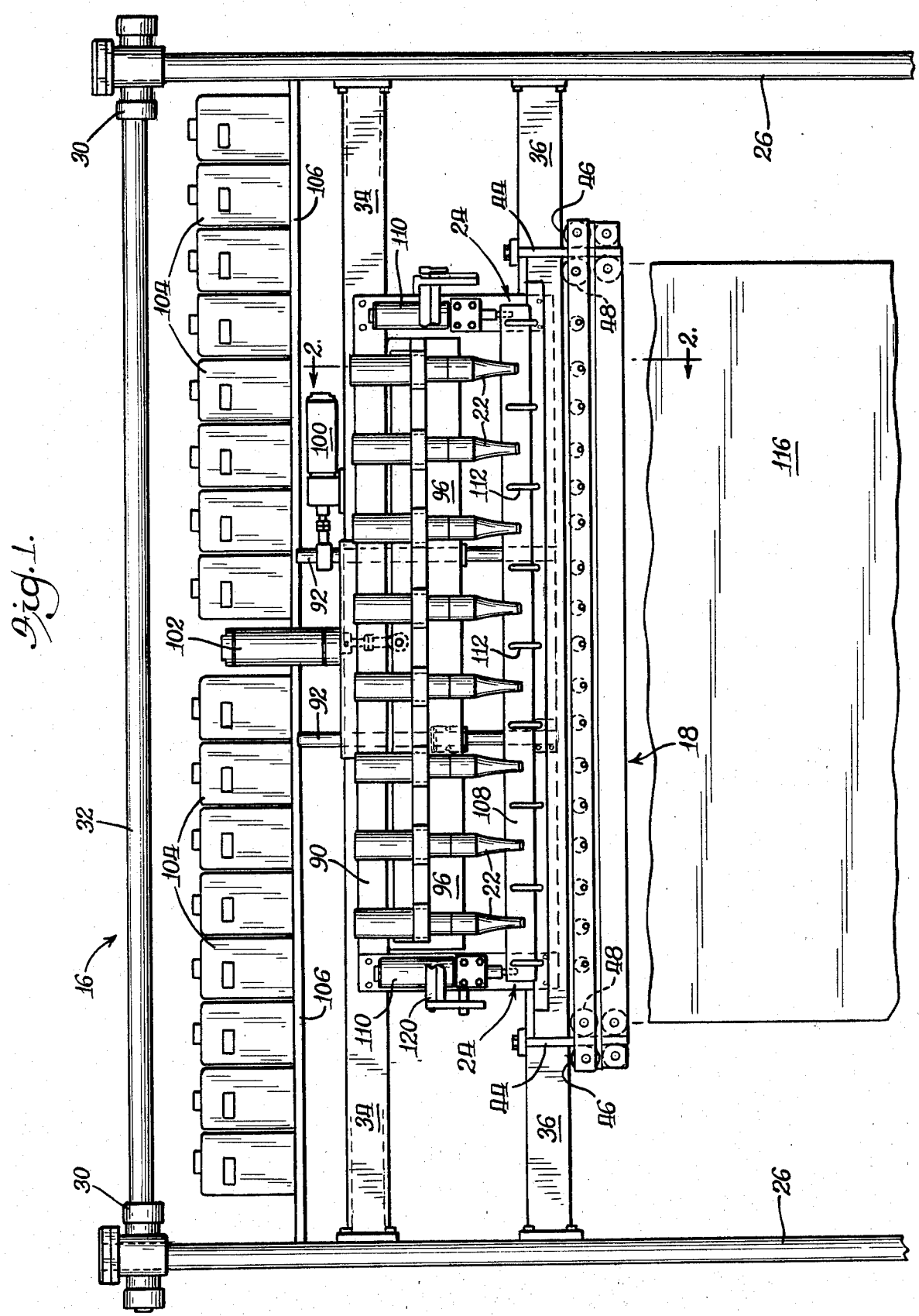

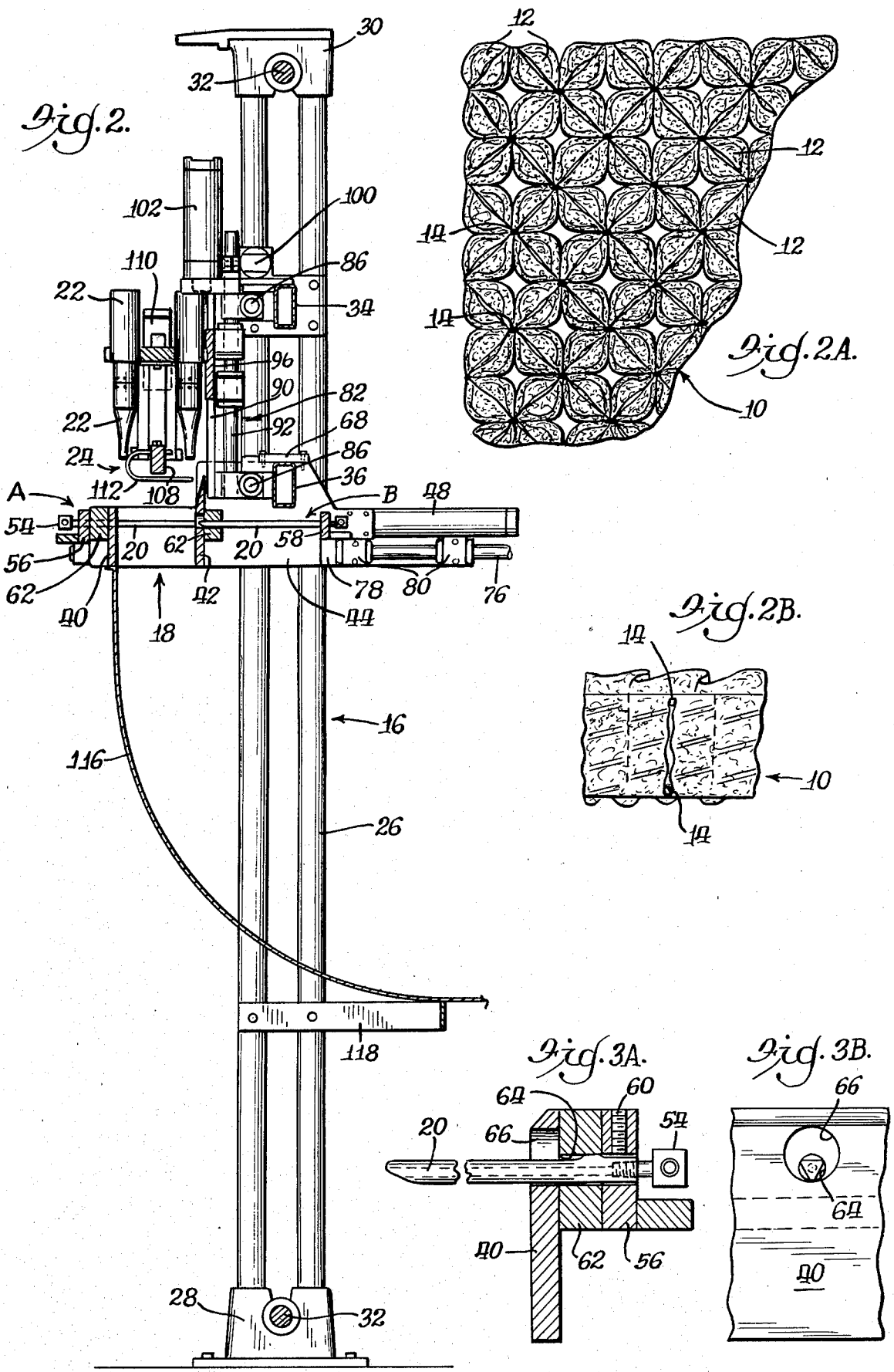

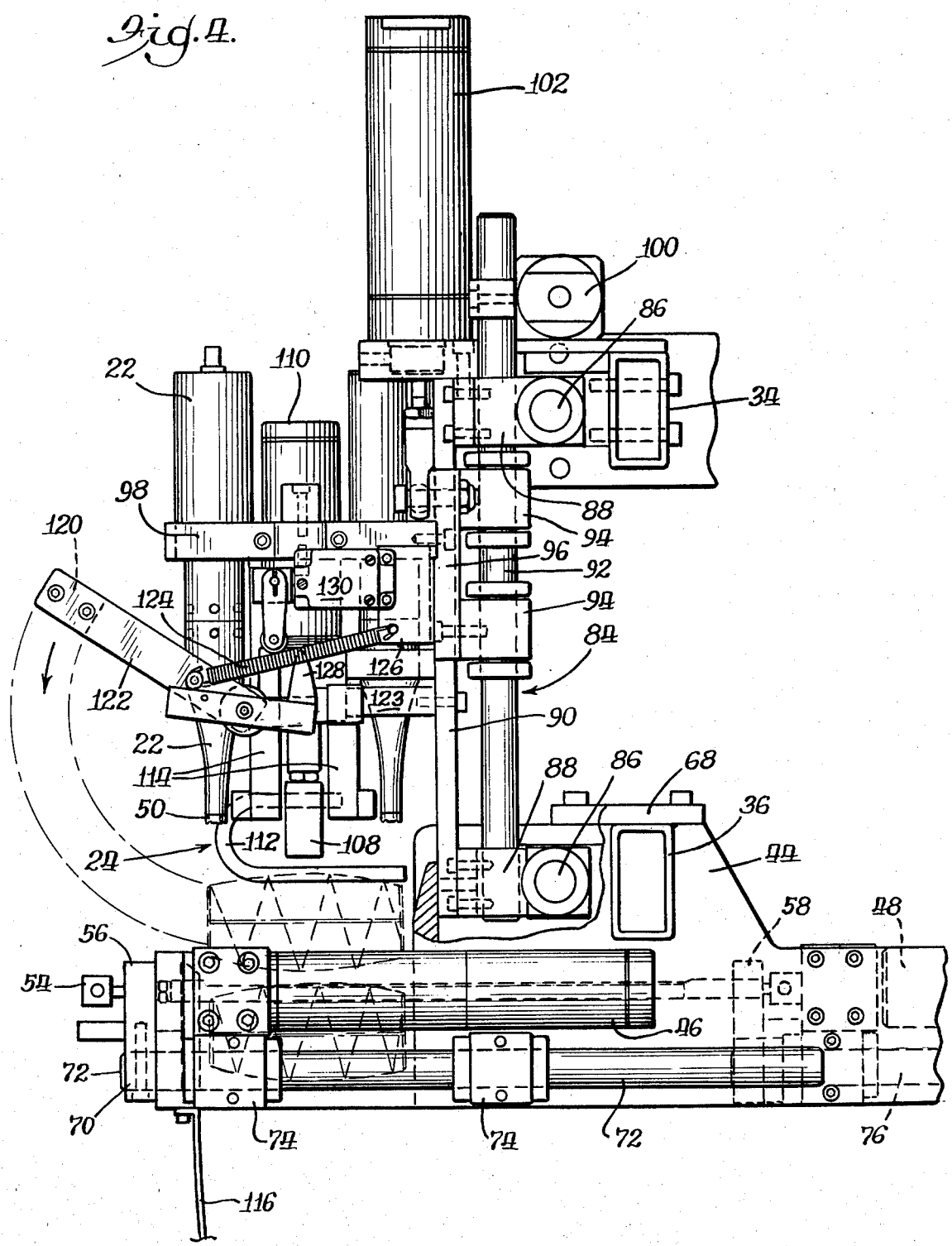

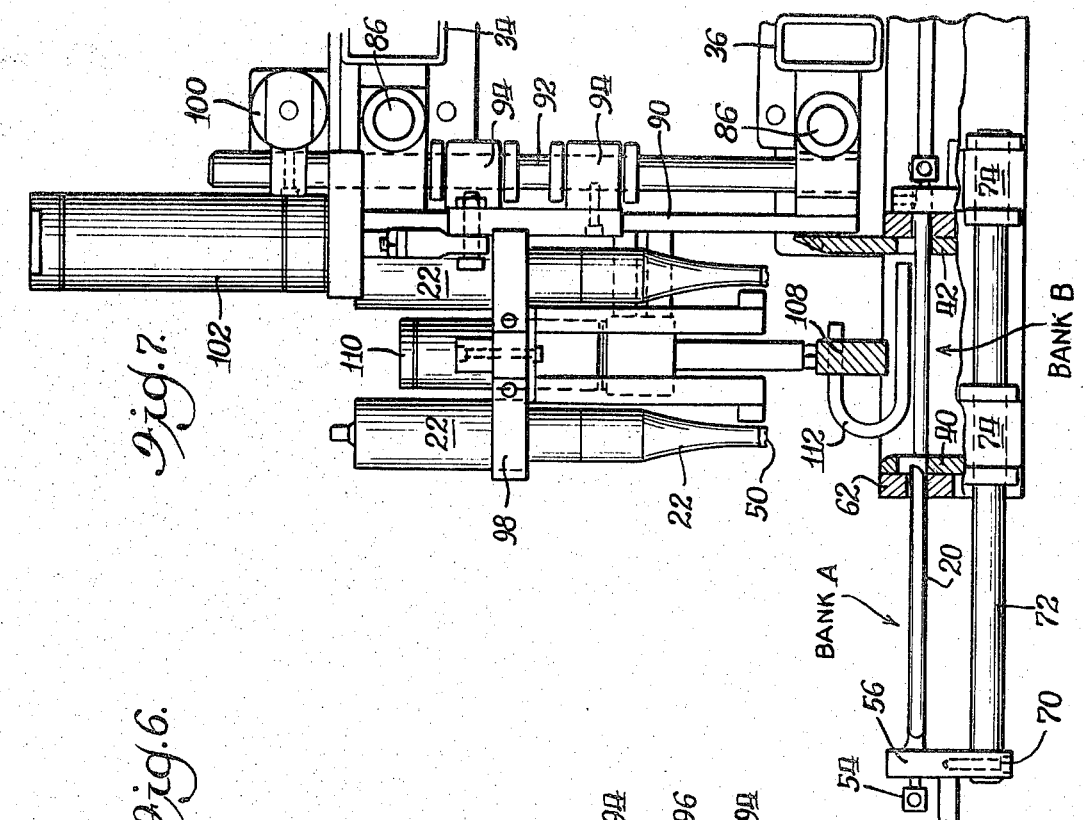
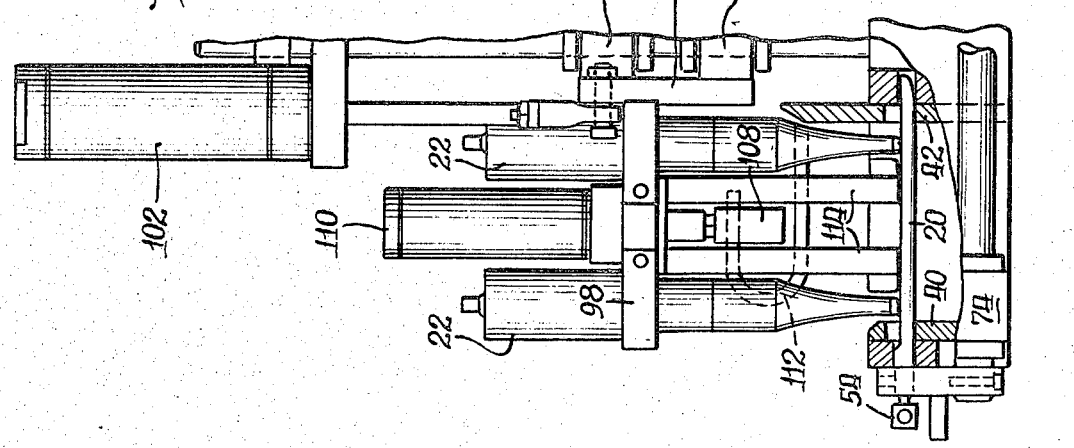
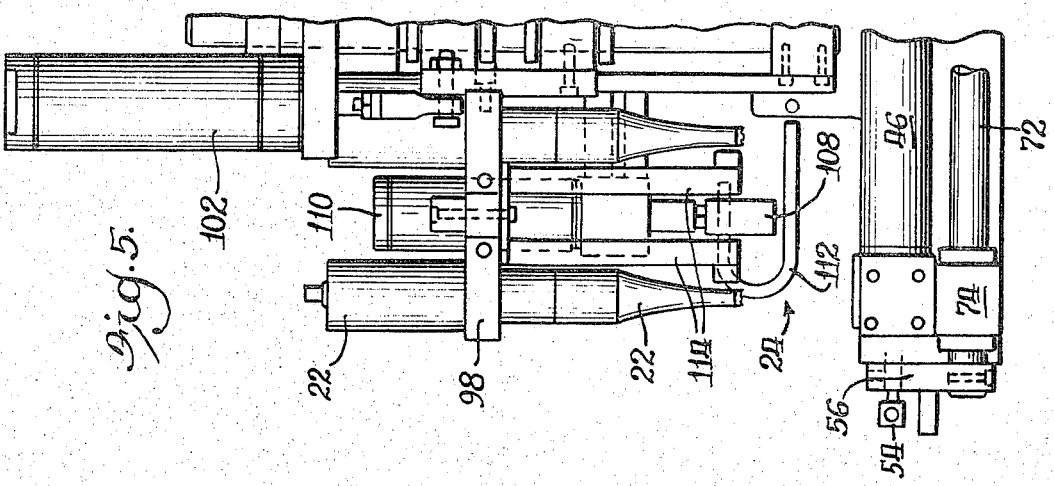

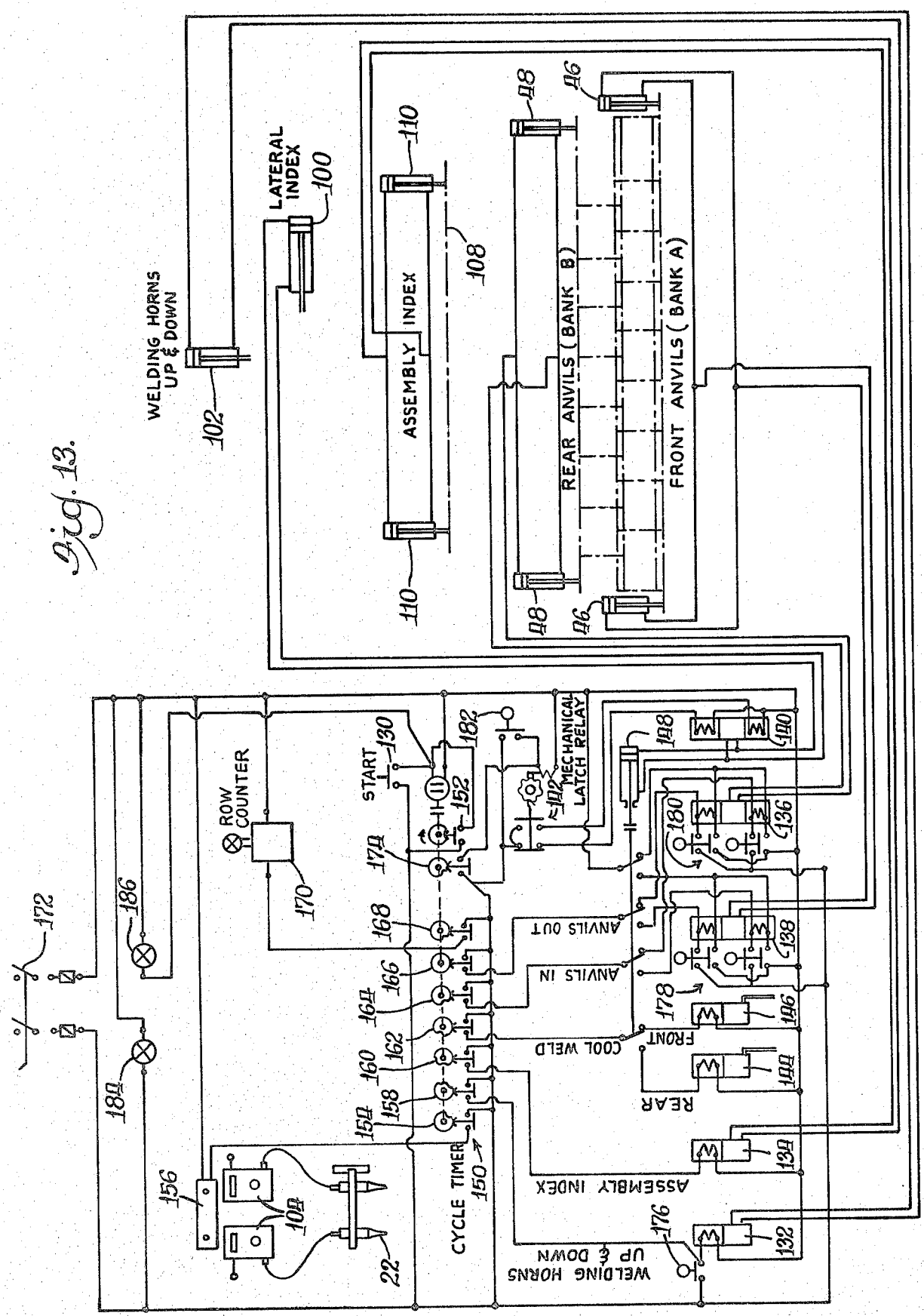

APPARATUS FOR MAKING ASSEMBLIES OF POCKETED SPRINGS

This is a continuation-in-part of application Ser. No. 242,678, filed Mar. 11, 1981, now abandoned.

This invention relates to the manufacture of assemblies of cloth-pocketed upholstery springs, referred to in the furniture trade as "Marshall" constructions, for use as the spring cores of mattresses, seat cushions, and the like.

More particularly, the invention provides an apparatus for assembling successive strips of pocketed springs, one strip at a time, into a unified whole by connecting the interspring web of pocket material of each successive strip to that of its predecessor strip at intervals along the two strips. In that fashion, as many strips of springs as are necessary are joined successively to form a spring core of the desired dimension, staggering the interstrip connections so that, along its own length, each interior strip of springs is connected alternately to its flanking strip on one side and then to its flanking strip on the other side.

The spring assembly itself, and the basic method for its manufacture, are disclosed and claimed in my U.S. Pat. No. 4,234,984.

The specific form of assembly apparatus disclosed contemplates the use of ultrasonic thermal welding devices for joining the strips of pocketed springs together, and, preferably, the utilization of a thermally weldable fabric as the pocket material. The invention, however, should not be regarded as limited to those particulars, inasmuch as other known instrumentalities for joining layers of fabric, e.g., by sewing or by the use of connectors such as grommets or rivets or clamp fasteners such as or analogous to hogrings or staples, may also be employed.

It is the ultimate object of the invention to provide apparatus for the assembly of the dimensionally-stable Marshall construction of Pat. No. 4,234,984, earlier referred to, on a production basis, and one which may lend itself to further automation of the procedure so as to form spring cores from strips of pocketed springs assembled row upon row as fully automatically as the assembly of open-coil spring constructions is now conventionally performed.

Further and more specific objects will become apparent and the invention understood by reference to the following specification, taken in conjunction with the accompanying drawings, in which:

FIG. 1 is a fragmentary front elevation of a preferred assembly apparatus in accordance with the invention;

FIG. 2 is a sectional side elevation of the same apparatus taken on the line 2—2 of FIG. 1;

FIG. 2A is a fragmentary face view of the spring assembly produced by the apparatus of FIGS. 1 and 2, as it might be viewed from the righthand side of FIG. 2, issuing from the assembly apparatus;

FIG. 2B is a fragmentary end view of the spring assembly of FIG. 2A, e.g., as seen from the top of FIG. 2A, illustrating the placement of the interstrip connections;

FIG. 3A is an enlarged fragmentary and sectional side view of an interior detail of the apparatus;

FIG. 3B is a fragmentary elevation of the same detail;

FIG. 4 is an enlarged and partly sectioned fragmentary side view of the assembly station of the apparatus;

Figure 8:
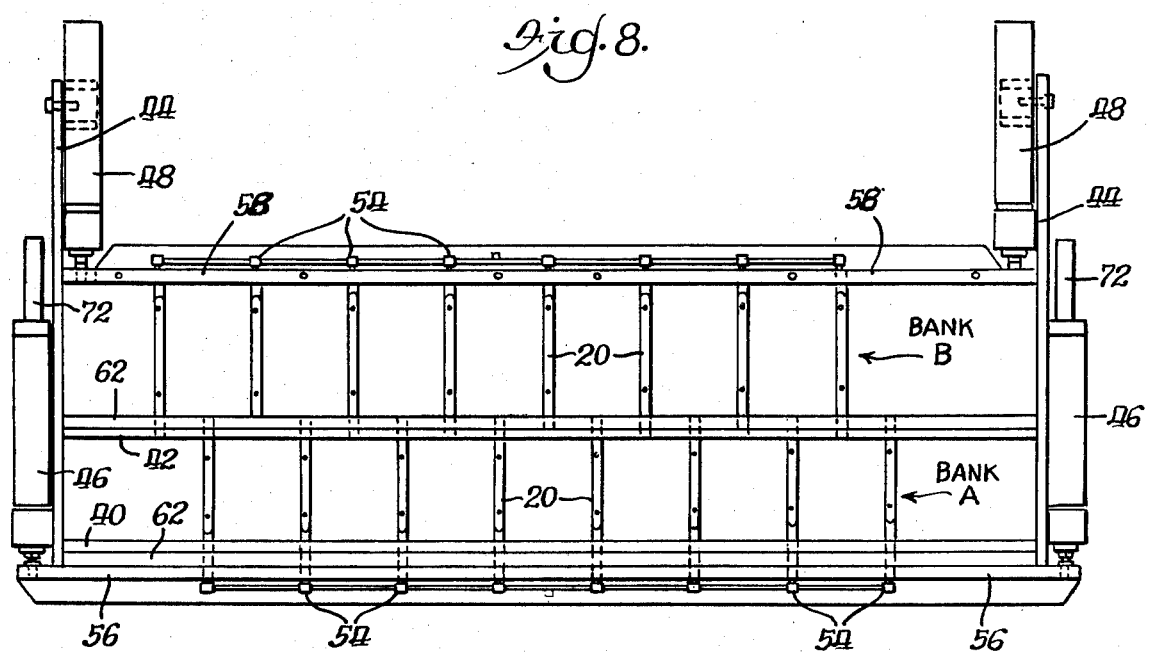
Figure 9:
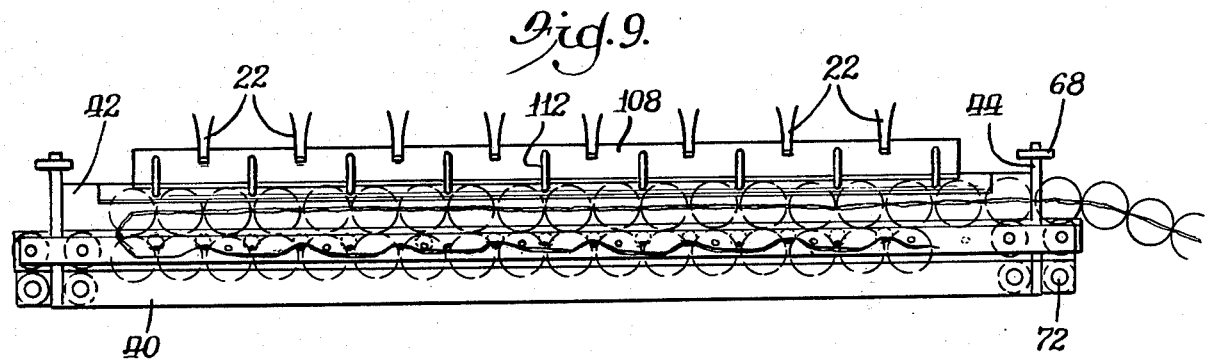
Figure 10:
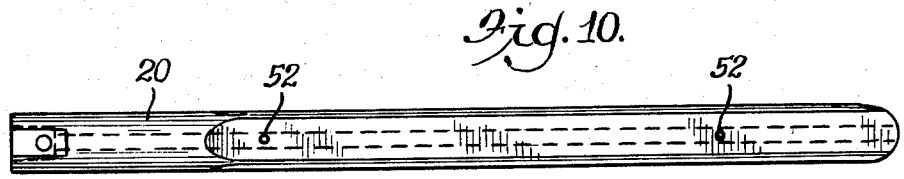
Figure 12:
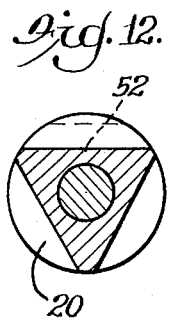
Figure 11:
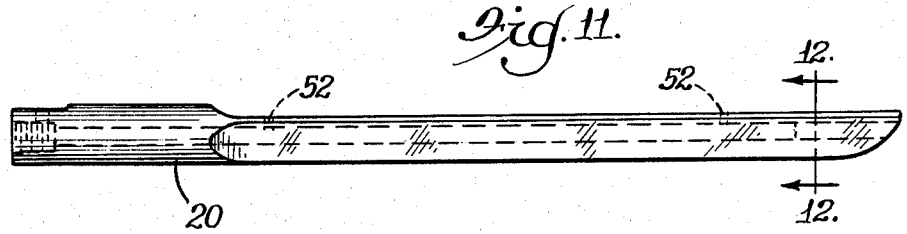
Figure 14:
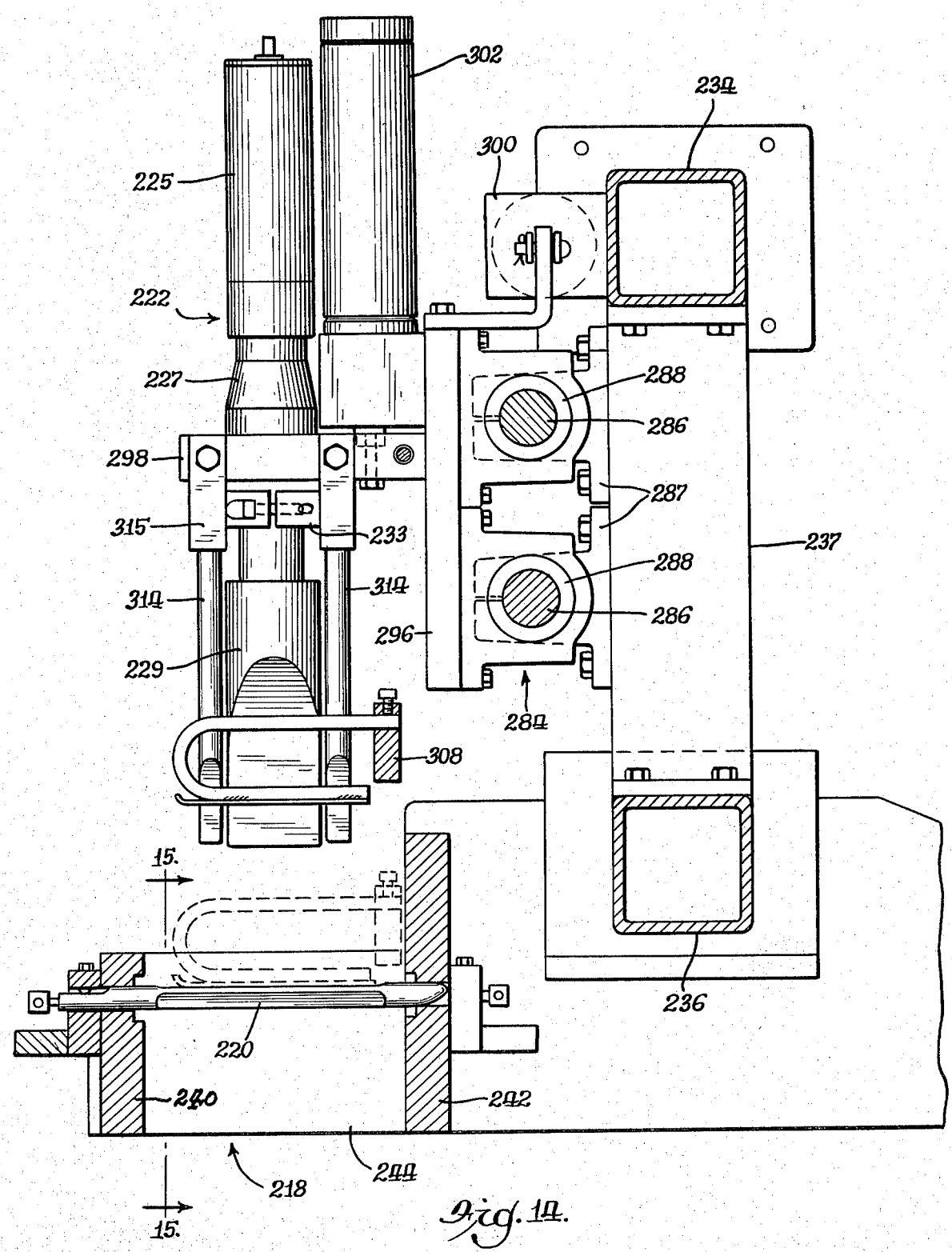
Figure 15:
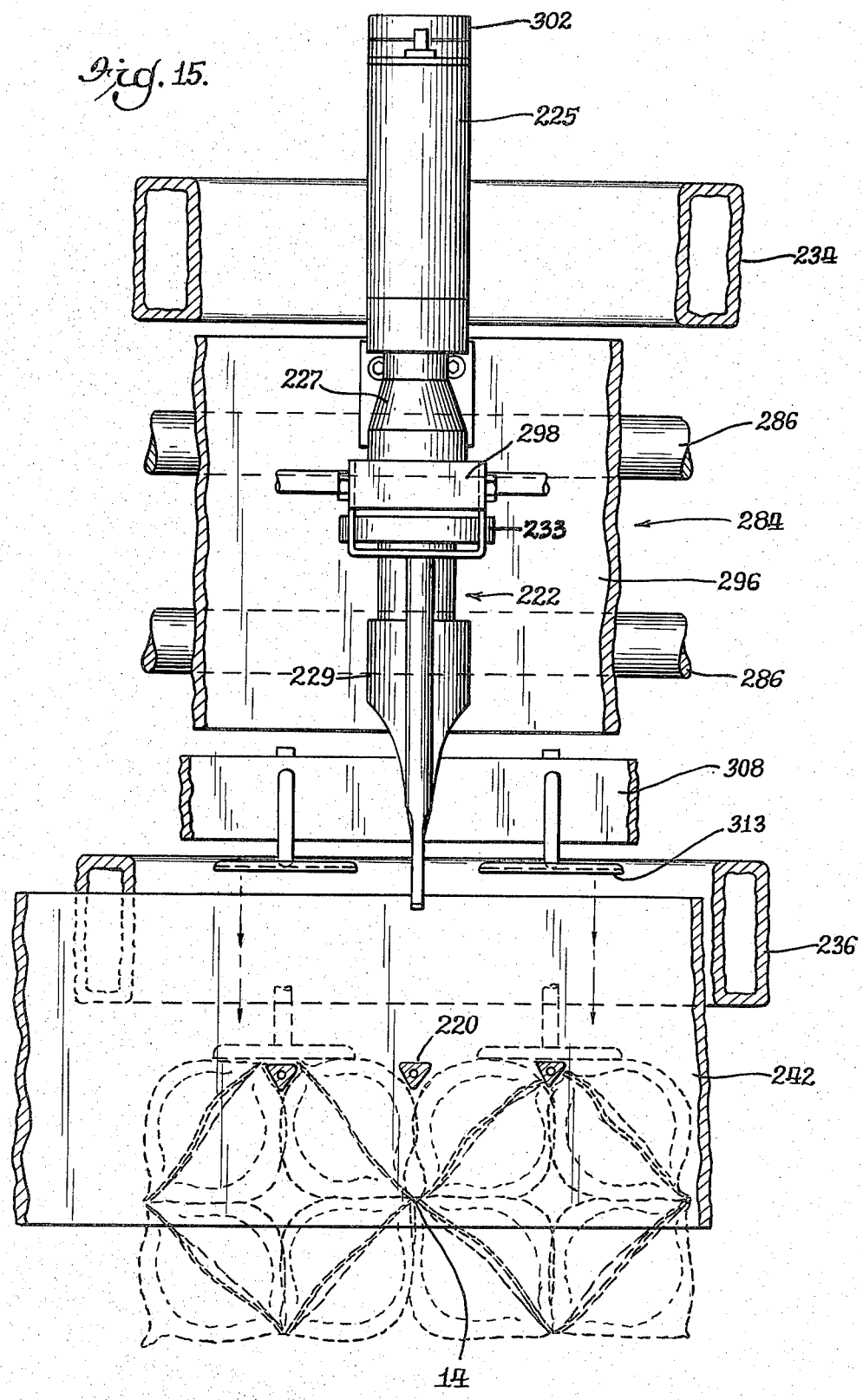
Figure 16:
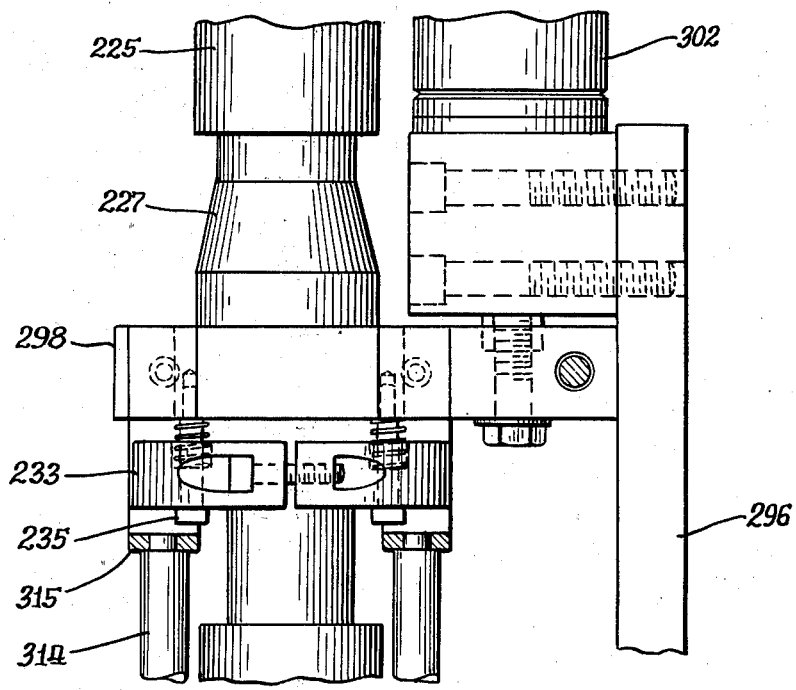
Figure 17:
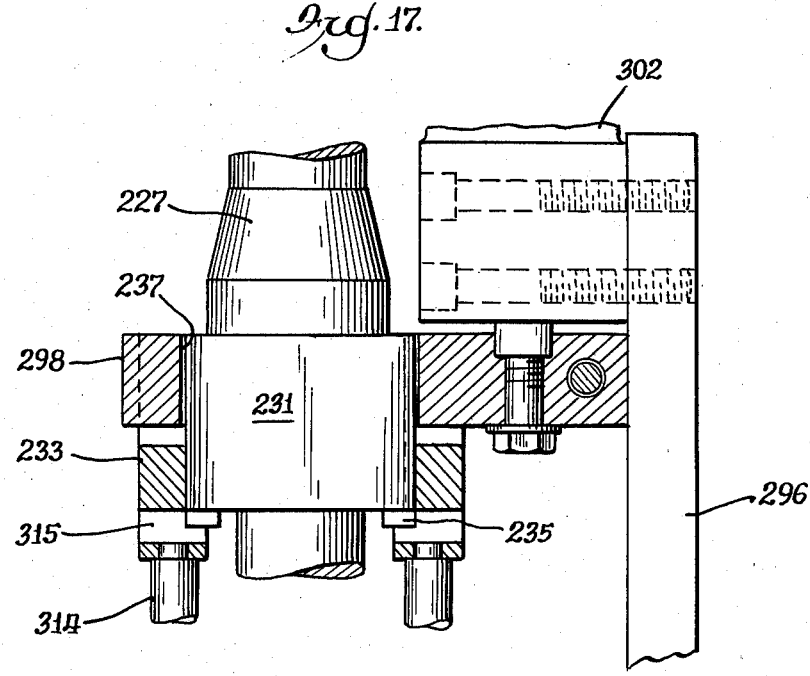

FIGS. 5, 6, and 7 are enlarged fragmentary and sectional elevations of the apparatus as seen in FIG. 2, illustrating the sequence of positions of the operative parts of the disclosed apparatus during a single cycle of operation;

FIG. 8 is a plan view of the assembly station of the apparatus poised for the beginning of a spring assembly;

FIG. 9 is a front elevation of the same, showing the first two strips of a new assembly positioned to be joined;

FIGS. 10, 11, and 12 are respectively plan, elevational, and sectional views of the anvils upon which the connections between successive strips are made; and FIG. 13 is a diagram of the electrical and fluid circuitry which governs and powers the operation of the apparatus;

FIG. 14 is a sectional side elevation of a modified form of the apparatus, similar to FIG. 2;

FIG. 15 is a fragmentary front elevation of the modified apparatus shown in FIG. 14;

FIG. 16 is a fragmentary enlargement of a portion of the modified apparatus as shown in FIG. 14; and FIG. 17 is a fragmentary sectional elevation corresponding to FIG. 16 and taken through the axis of symmetry, as shown in FIG. 15.

BRIEF DESCRIPTION OF THE INVENTION

As earlier noted, the invention contemplates the formation of a pocketed-spring construction 10 (FIG. 2A) by joining successive strips 12 of such springs to one another, seriatim, to build the assembly.

As in prior constructions of the pocketed-spring type, it is further contemplated that the successive strips of springs so joined may, if desired, be the successive runs of a continuous strip of springs, laid upon itself row upon row, in serpentine fashion.

The interstrip connections 14 are made by joining the interspring webs of the pocket material of adjacent strips, preferably at intervals of two springs along each of the successive strips, as each new strip is added to build the construction to the desired size. The interstrip connections are staggered by one spring from strip to strip with the result (referring to FIG. 2A) that each spring, in addition to being integrally connected by the pocket material to the adjacent springs of its own strip, is likewise connected, by the apparatus, to its diagonal neighbors of each adjacent strip. As each group of four springs surrounding each such interstrip connection 14 is secured together as a tight cluster, and as each interior spring is simultaneously a part of two such diagonally-arranged clusters, the assembly as a whole exhibits a dimensional stability in the plane of the construction which is uncharacteristic of Marshall constructions of the nested spring type, i.e., wherein the springs of successive strips are nested in the crevices between the springs of the adjacent strips.

The disclosed apparatus for so connecting successive strips of springs into a unified assembly or construction comprises a support in the form of an upright rectangular frame 16 having thereon a box-like assembly station 18 which is open top and bottom. A series of aligned retractable probe-like anvils 20 (FIG. 2) are adapted when inserted into the station 18 to fit between adjacent springs of a strip of cloth-pocketed springs emplaced therein, and to engage the web of pocket material between two springs (FIG. 9). The spacing of the sixteen illustrated anvils 20, eight in each bank, is such that each bank supports a strip of coils by engagement with the interpocket web of material between two adjacent springs at intervals of two springs along the spring strips.

Also carried by the frame in opposition to the line of anvils is a parallel line of ultrasonic fastening heads 22 movable toward and away from the anvils. The fastening heads, when inoperative, are spaced sufficiently from the anvils to permit the emplacement between them of two strips of pocketed coils, i.e., the strip of coils last connected to the assembly and the new strip to be connected thereto.

A positioning mechanism 24 serves to hold each new strip of springs in alignment with the strip of springs previously added to the assembly, and, in the disclosed apparatus, also serves to index the assembly through the station for the addition of yet another strip of springs.

In a spring assembly which utilizes barrel-shaped spring coils, as illustrated, the connections 14 of adjacent strips of springs to each other may be made simultaneously at two sites along a given interspring web of pocket material, each connection 14 being located inwardly of and near the ends of the individual springs, i.e., disposed inwardly of the assembly from its two load-bearing surfaces. For this purpose, the fastening heads 22 which connect successive strips of springs to each other are arranged in pairs, while the anvils against which they press the four superimposed layers of pocket material of the interpocket webs are shaped and proportioned so as to fit readily into the space between the two springs bracketed by the connections between the two previous strips, i.e., so as to cooperate with the fastening heads in connecting each new strip to the last.

Alternate ones of the aligned anvils 20 of the assembly station 18 are connected together as two banks, A and B, which also alternate in function, and are conveniently, but not necessarily, inserted into the assembly station from opposite sides. Each bank of anvils is separately movable on the support to withdraw the anvils from the assembly 10 after each interstrip connection is made, thus to permit the indexing of the assembly in the machine direction for the feeding of the next strip of pocketed springs to be joined. Because the anvils of the alternate bank were reposed in the voids of the spring clusters formed by the connection of each new strip, the indexing of the construction by the positioning mechanism 24 suspends the assembly upon the alternate bank of anvils by their engagement with the webs between the pairs of springs which lie between the welds made in the last-joined strip. This indexing movement also positions the assembly for the reinsertion of the first bank of anvils, over the top of the indexed assembly, after which a new strip of coils is fed into place.

To connect successive strips of springs to the assembly by connections which are staggered or offset from strip to strip, the entire array of fastening heads 22, and the coil-strip positioning and assembly indexing mechanism 24 are indexed laterally relative to the spring assembly for each new cycle of operation, the fastening heads cooperating with one bank of anvils on one cycle and with the other bank on the next.

The movements of the various parts of the apparatus are powered in predetermined sequence by fluid power, compressed air in the illustrated case, under the control of an electrical program controller, each cycle of which is initiated after a new strip of springs is emplaced for addition to the assembly.

DETAILED DESCRIPTION OF THE APPARATUS

The Assembly Station

The upright rectangular frame 16 of the apparatus comprises a pair of widely spaced standards 26, each consisting of a pair of vertical parallel bars maintained in narrowly spaced relation by a flanged base bracket 28 at the bottom and a flanged anchor bracket 30 at the top. The brackets are cast to provide sockets to receive the vertical bars of the standards, and also to provide transverse sockets which receive upper and lower cross bars 32 which complete the frame.

Extending between the opposed standards within the frame are two vertically spaced cross beams 34 and 36 of rectangular cross section, each provided with a mounting flange at each end for screwing the cross beams to the upright standards.

The spring strip assembly station 18 comprises a laterally elongated front plate 40 and a deeper rear plate 42, each connected to a pair of side plates 44 which are shaped and proportioned to suspend the assembly station from the lower cross beam 36 and to provide mounting sites for the air cylinders 46 and 48 which separately insert the two banks, A and B, respectively, of anvils 20 into the assembly station.

Each anvil 20 is formed from mechanical, i.e., thick-walled, tubing which is milled flat on three sides at equal angles to each other to provide a triangular cross section with intervening fragmentary cylindrical surfaces throughout the insertable length of the anvil (FIGS. 3A, 3B, 10, 11 and 12).

Each anvil is rotatably positioned with a flat side up for good contact pressure against the button tip 50 of the cooperating fastening heads 22, and is drilled to provide two holes 52 aligned with the fastener head tips to emit a blast of cooling air from the anvil to lift the pocket material web, and to cool and set the weld. The tip of the anvil tube is plugged to limit air egress to the holes 52. The anvil tip is also rounded, as well as curved along its lower edge, to facilitate the passage of the anvil between and over the coils of the last-joined row of the assembly, and its ultimate seating in the bearing hole of the far plate, as the anvil is inserted into the assembly station.

At its base end, each anvil 20 is tapped with tapered pipe thread to receive an air-line T-fitting 54, and is milled flat on top so that all of the anvils of one bank can be locked in proper rotative orientation in one of the two mounting bars 56 and 58, each of which is angle-shaped in cross section for adequate rigidity. The vertical flange of each mounting bar is drilled horizontally to receive the base ends of the anvils, and drilled and tapped vertically for the set screws 60 which lock the anvils in the bars. Each is also drilled at its ends to receive the piston rods of the air cylinders 46 and 48 which reciprocate the bars 56 and 58 respectively to insert and retract the banks of anvils A and B, respectively, into and from the assembly station 18 (FIG. 8). The air passages of each bank of anvils are manifolded to a common supply line by the T-fittings 54 at the base of each anvil.

Guide bearings for each anvil are provided by a bearing bar 62 of substantial thickness, dowel pinned and screwed to each of the front and rear plates 40 and 42 of the assembly station (FIGS. 2, 3A). Each bar is drilled to provide a bearing hole 64 for each anvil of both banks of anvils, the bearing holes 64 being preferably bored and reamed to size after assembly of the bearing bars with the side plates in order to align the opposed bearing holes precisely. The bearing holes 64 are interiorly tangent to the lower edges of larger holes 66 in the front and rear plates 40 and 42 themselves, whose purpose is to provide relief at the assembly station for the ruffled flap of the pocket-closing seam of the spring strips which might otherwise extend into the path of one of the descending fastener heads 22 to interpose more than the intended four thicknesses of pocket material between the fastener head tips 50 and the anvils (FIG. 3B).

The side plates 44, as earlier noted, are milled to receive the lower cross beam 36 of the main frame upon which the assembly station is mounted, each side plate being underslung from the beam 36 by a straddle clamp 68 screwed to the upper edge of the plate.

To facilitate the actuation of the front bank A of anvils, the ends of the forward anvil mounting bar 56 are extended beyond the side plates 44 for connection to the piston rods of the air cylinders 46 mounted on the outside surface of the side plate (FIG. 8). Also at each end of the front mounting bar 56 a depending clamping block 70, secured to the underside of the bar, is clamped to the end of a slide shaft 72 supported in two spaced slide bearings 74 secured on the outside surface of the side plate 44 beneath the air cylinder 46 (FIG. 4). The slide shaft 72 and slide bearings 74 support and guide the front bank A of anvils during their insertion and retraction, but the anvils are nevertheless sufficiently closely fitted in the bearing holes 64 to transfer the load of contact by the fastener heads 22 to the bearing bars 62.

The air cylinders 48 for the mounting bar 58 of the rear bank B are conveniently mounted on the inside surfaces of the side plates, where each end of the rear mounting bar 58 is similarly carried for reciprocation upon a slide shaft 76 clamped in depending blocks 78 at its ends, and slidably journaled in spaced slide bearings 80 secured to the inside surface of the side plate 44 behind the rear plate 42 of the assembly station (compare FIGS. 2, 8, and 9).

As earlier noted, the opposed action of the two banks of anvils A and B is not essential to the invention; by a suitable interfitting comb-like redesign of the mounting bars 56 and 58, both banks could be inserted in the same direction, for example, from the rear, if closer access to the assembly station from the front were found desirable in the illustrated apparatus (or from either top or bottom if horizontal assembly and indexing were preferred).

The Mounting of the Fastening Heads And Coil Strip Positioning Mechanism

The fastening heads 22 are movable on two mutually perpendicular axes to bring the fastening heads into alignment first with one bank of anvils 20 and then with the other, and to move the fastening heads toward and into cooperation with the anvils, and to retract them for the feeding of a new strip of springs.

This compound movement, in a vertical plane in the illustrated apparatus, is provided by a vertically-mounted compound indexing "table" 82 which spans the cross beams 34 and 36 of the upright frame 16.

Referring to FIG. 4, the primary carriage 84 of the indexing mechanism supports the fastener heads 22 and coil-positioning mechanism 24 for transverse indexing relative to the spring assembly, whereas the secondary carriage of the indexing table provides for vertical movement of the fastener heads into engagement with the anvils.

Specifically, each of two primary track shafts 86 of the indexing table is bolted to one of the cross beams 34 and 36, longitudinally thereof, to support the laterally shiftable primary carriage 84 of the indexing mechanism. The primary carriage 84 comprises four anti-friction slide-bearing blocks 88, two on each horizontal primary track shaft 86, which are connected together in spaced relation on the track shafts 86 by a rectangular subframe 90 which carries the positioning mechanism 24.

The slide bearing blocks 88 are also spanned vertically by two vertical track shafts 92, each of which carries two slide bearing blocks 94 which are secured in spaced relation to a cross beam 96 to constitute the secondary carriage which supports the fastening heads 22 for vertical movement.

The fastening heads 22, illustrated as comprising two parallel banks of ultrasonic transducers, eight in each bank, are held in pairs in eight clamping bars 98 extending forwardly from the cross beam 96, to which each clamping bar is screwed. The lateral indexing movement of the fastener heads 22, i.e., the sideward movement of the primary carriage 84 on the primary track shafts 86, is effected by a double-acting air cylinder 100 (FIG. 1) which is secured in an anchor block on the upper cross beam 34 wih its piston rod connected by a suitable clevis or the like to a stud on a clamp conveniently secured to one of the vertical track shafts 92 for the secondary carriage.

The vertical movement of the ultrasonic fastening heads toward and away from fastening cooperation with their associated anvils, i.e., the vertical movement of the secondary carriage formed by the cross beam 96 and the slide bearings 94, is effected by a double-acting air cylinder 102 mounted on the subframe 90 of the primary carriage, with its piston rod connected by suitable clevis or the like to the cross beam 96.

In the illustrated apparatus, employing a total of 16 ultrasonic fastening heads 22, a separate ultrasonic frequency generator 104 is provided for each fastening head, and the bank of ultrasonic generators is placed in near proximity to the fastening heads 22 on a shelf 106 supported by the frame standards above the upper cross beam 34 of the fixed frame. Each ultrasonic generator 104 is, of course, suitably connected to a source of power and to its associated transducer 22 by conductors which are not illustrated except in the circuit diagram of FIG. 13. The fluid connections to the several air cylinders likewise appear only in the circuit diagram of FIG. 13.

The spring strip positioning mechanism 24, as earlier noted, is mounted on the rectangular subframe 90 of the primary carriage of the indexing table. It comprises a spring strip indexing bar 108 secured at its ends to the piston rods of a pair of double-acting air cylinders 110, each clamped in a mounting block secured to the vertical side members of the subframe 90 of the primary carriage 84 (FIG. 1). Arrayed along the indexing bar 108 is a bank of U-shaped locator fingers 112 beneath which each new strip of springs is inserted, and which serve to hold the individual springs of the new strip in registry with those of its predecessor for the descent of the fastener heads 22.

After each new strip of springs is connected to the assembly, the assembly is indexed downwardly by the indexing bar 108, actuated by the air cylinders 110 after the withdrawal from the assembly station of that bank of anvils upon which the connections of the most recently added spring strip were made. This indexing movement forces the newly-added spring strip down upon the alternate bank of anvils, upon which the joining of the next spring strip will be performed.

In that connection, it is now timely to observe, in FIG. 2A, that as each new spring strip is added to the assembly by the connection of its interspring webs to those of the preceding strip, each coil pocket is rotated one-eighth turn from the strip axis, which tends to foreshorten the new strip as its coils are drawn by the newly-made connections into close association with those of the previous strip. The spacing of the locator fingers 112 of the indexing bar is therefore preferably that of adjacent anvils 20 of either bank of anvils, rather than the untensioned two-coil spacing of the coils with the pocket-closing seams in line. For purposes of good registry of the coils of successive strips in the assembly, as well as for the sake of dimensional stability of the completed construction, I prefer to maintain a slight tension in the connected strips of the assembly such that when the indexing bar 108 descends and the locator fingers 112 push the newly-joined strip downwardly toward the alternate anvils destined for use in the next cycle, the springs which flank the alternate anvils are forced apart by the intrusion of the upper surface of the anvil between them, and then snap back audibly as their interconnecting web seats itself upon the anvil.

Conversely, by so spacing the coils of each new strip as to register with those of the assembly, the newly-fed strip is essentially untensioned before the interstrip connection is made. Therefore, to position the interpocket web unerringly in registry with the anvil for the descent of the fastening heads, each pair of fastening heads is provided with an intervening pair of guide blades 114 which are secured to the clamping bar 98 which supports the associated pair of fastener heads so as to align them in common with the anvils. The guide blades descend with fastener heads 22, and by passing between the coils, force the interspring web down onto that of the predecessor strip, while the thicker tips 50 of the fastening heads enter the wider space between the diverging outlines of the coils to weld the four thicknesses of pocket material together against the anvil.

As the assembly 10 develops in size by the addition of successive strips 12 of springs, its downward progression from the assembly station 18 is desirably guided by a delivery plate 116 of light sheet metal or the like which may be secured at its upper edge to the underedge of the front plate 40 of the assembly station, and supported in a rearwardly bent curve by arms 118 secured to the frame 16, so as to deliver the spring assembly to a run-out table or the like.

When the assembly has reached the desired size, i.e., when the designated last strip of springs is placed in the assembly station, the operator severs the designated last strip from the supply (assuming a serpentine lay-up), and initiates the final cycle, at the conclusion of which both banks of anvils are in the assembly station. The operator then overrides the program controller by a manual switch to withdraw the last-used bank of anvils on which the asssembly is supported, and the assembly falls by its own weight to clear the assembly station for the assembly of the next construction.

To maintain good height alignment of the springs of the assembly, I find it desirable to maintain the assembled springs in reasonable axial confinement in the assembly station, and to provide for the axial registry of the coils of each new strip with those of the prior strips. The desired alignment is provided by an aligning bar 120 which spans the assembly station from side to side, being secured at each end to one of two arms 122 pivoted on a common axis to brackets 123 secured to the subframe 90 of the primary carriage of the indexing table. An overcenter spring 124 connected between one of the arms 122 and a switch-mounting bracket 126 on the subframe 90 normally holds the aligning bar 120 aloft, while a switch actuating cam 128 mounted coaxially with the same arm and pinned thereto deflects the operating arm of a one-way switch 130 on the bracket 126 with each stroke of the aligning bar 120, actuating the switch, however, only on the up stroke.

Cycle Of Operation

At the beginning of each normal cycle, i.e., after the first two strips are connected, both banks of anvils 20 extend into the assembly station with one bank, say Bank A, in position to be engaged in fastening cooperation by the ultrasonic fastening heads 22. The fastener heads 22 are poised sufficiently well above the anvils 20 to accommodate two strips of springs, and lower and last-joined strip being emplaced upon and suspended from the anvils of Bank A, and the new strip resting upon it positioned in coil-upon-coil registry therewith by the locator fingers 112 of the indexing bar 108, and with the anvils of Bank B above the last-joined strip and beneath the new strip (FIGS. 4 and 5).

Upon the initiation of the machine cycle by the raising of the aligning bar 122 by the operator, the ultrasonic fastening heads 22 descend en masse, driven by the cylinder 102, first engaging the interpocket webs of the upper strip of springs, forcing them into contact with the interpocket webs of the registering lower strip, seating both webs firmly against the Bank A anvils, and welding the two webs together (FIG. 6).

After the welding of the webs, the fastening heads 22 are retracted by the cylinder 102, a blast of cooling air from the holes 52 of the Bank A anvils lifts the welded interspring webs from the anvils, and the Bank A anvils 20 are retracted en masse by their actuating cylinders 46.

The assembly is then forced downwardly by the indexing bar 108, powered by its two actuating cylinders 110, to seat the interspring webs of newly-joined row upon the Bank B anvils (FIG. 7). Each pair of springs bracketed by the connections made on the anvils of Bank A straddles one of the anvils of Bank B, being forced apart by the latter on their descent and reclosing beneath the anvil as their interconnecting web is seated upon it.

With the assembly indexed in the machine direction, the Bank A anvils are reinserted, passing over the last-joined strip and into the crevices between the two coils which flank the connections just made. The fastening and positioning apparatus, viz., the overlying ultrasonic fastening heads 22 and the indexing bar 108, are then indexed laterally by one spring diameter to stagger the line of connections of the new spring strip, which is inserted by the operator beneath the locator fingers 112 and above the re-inserted Bank A anvils. The operator then lowers the aligning bar 120 to locate the new spring strip in proper position, and then raises the bar to re-initiate another cycle of operation of the machine, which is resumed by the descent of the fastening heads 22 onto the anvils of Bank B.

At the beginning of each new spring assembly, one bank of anvils will have remained in the station 18, either Bank A or Bank B, depending upon which bank was used for the final weld for the previous assembly. In any event, by manipulation of manual switches controlling the position of the two banks of anvils, the operator positions the bank of anvils in the assembly station which is compatable with the feeding direction of the first strip, i.e., so that the first pair of spring coils from the assumedly continuous supply straddles an anvil of the inserted bank, and withdraws the opposite bank (FIG. 8).

The operator then seats all of the first strip upon the inserted anvils, reinserts the previously withdrawn bank of anvils over the top of the first strip, and racks the second strip of coils over the first, inserting them beneath the locator fingers 112 of the assembly indexing bar (FIG. 9). The operator then lowers the aligning bar against the top strip, and raises the bar to initiate the machine cycle earlier described.

When the desired number of strips has been joined, the supply strip is severed and the bank of anvils which supported the assembly during the final weld is withdrawn, the assembly descends from the assembly station by its accumulated weight to make way for the beginning of its successor.

Control and Power Circuitry

The electrical and fluid circuitry for powering the operation of the apparatus in accordance with the earlier described sequence of operations is shown in FIG. 13.

The several air cylinders, all double-acting in nature, are gathered on the righthand side of the diagram and are connected by appropriate supply lines to a source of pressure air (not shown) through solenoid operated valves arrayed in a line at the lower end of the electrical circuit diagram on the lefthand side of FIGS. 13.

Thus, the cylinder 102 which lowers and raises the welding horns or fastening heads 22 is controlled by a valve 132 which is biased to apply pressure air to elevate the fastening heads, which are depressed only for the relatively brief period during which the solenoid of the valve 132 is energized. Similarly, in the case of the cylinders 110 which operate the indexing bar 108 to advance the assembly after each new spring strip is joined to it, the control valve 134 is likewise biased to raise the bar 108 to the elevated position illustrated in FIGS. 1, 2, and 4, the piston rods of the cylinders 110 being extended only for the brief time that the solenoid of the valve 134 is energized.

The cylinders 46 and 48, on the other hand, which govern the positions of the front and rear banks of anvils, and which are required under certain circumstances to maintain their positions of withdrawal or insertion, are controlled respectively by the double-solenoid valves 136 and 138, each of which is biased to a neutral, locking position as its "power off" condition so as to maintain whatever position of the associated bank of anvils was last dictated.

Similarly, the air cylinder 100 for the lateral indexing of the fastener heads 22 and the coil positioning mechanism 24 is controlled by a double-solenoid valve 140, the solenoids of which are energized alternately on successive cycles of operation of the apparatus by a mechanical latch relay 142.

The remaining air-operated functions, namely the blasts of cooling air emitted from the blow holes 52 of the anvils, being momentary in operation, are controlled by valves which are spring biased to the closed position and opened only when their respective solenoids are energized, the front bank cooling valve being 144 and the rear bank cooling valve 146.

The coordination of the position of the anvils and of the appropriate anvil air blast with the lateral position of the fastening heads 22 is determined by an air-powered, double-acting slave relay 148, whose position agrees with that of the lateral indexing cylinder 100, and whose electrical contacts are arranged so as normally to apply power only to one set of the anvil-positioning air cylinders 46, or 48, at any one time. That is, with the piston rod of the lateral indexing cylinder 100 retracted as indicated in FIG. 13, the piston of the relay cylinder 148 is likewise retracted and its contacts closed to route power only to the solenoids of the valve 136 which controls the position of the front anvils of bank A so that while the fastening heads 22 are indexed to the right, only those functions associated with the front bank of anvils are operative, and those functions associated with the rear bank of anvils are disabled.

Specifically, with the fastening heads 22 indexed right as seen in FIGS. 1, 8, and 9, the fastening heads descend upon the front bank A of anvils to weld the two strips together, after which a cooling blast of air is emitted only through the valve 146 and the front bank A of anvils to cool those welds. The front anvils are then withdrawn and the assembly is indexed by a momentary and reciprocal vertical movement of the indexing bar 108, driven by the cylinders 48 through the control valve 134, after which the front bank A of anvils is re-inserted, completing a single cycle for the sealing of two spring strips together on the front bank of anvils as described. During this cycle, the rear bank B of anvils remains stationary in its normal position, i.e., inserted in the assembly station, and as the final event of the cycle, the mechanical latch relay 142 is energized momentarily to cause the lateral indexing valve 140 to shift the fastening heads and indexing bar to the left by the extension of the piston rod of cylinder 100, with the cylinder of the slave relay 148 following to position the relay switches to condition the circuit to permit only the energization of the two valves controlling the position of the rear bank of anvils, bank B, and to emit the cooling air through that bank of anvils, i.e., to condition the apparatus for a new strip of coils and a new cycle using the alternate bank of anvils.

The aforementioned operations of the solenoid-controlled air valves and of the mechanical latch relay 142 are programmed by the multiple cams of a motor-driven industrial timer 150, which is energized through the starting switch 130 closed by the raising of the aligning bar 120 after each new strip of coils is positioned, and maintains itself energized for one revolution of the cam shaft through the holding switch 152, calling each of the aforementioned functions of the apparatus into operation in the aforedescribed sequence.

The far left-hand cam 154 of the timer 150 as viewed in the diagram of FIG. 13 energizes the ultrasonic welding horns momentarily through a timing circuit 156 which is more precise in its operation than the cam of the industrial timer, and dictates the exact duration of the application of power to the ultrasonic generators 104 which, in turn, power the transducers of the fastening heads 22. The timing circuit is adjustable to provide the precise momentary application of ultrasonic vibration suitable to the requirements, which, in the case of the four layers of fabric contemplated in the described assembly operation is of the order of a minor fraction of a second, well bracketed by the period during which the fastening heads are engaged with their respective anvils by the force of the cylinder 102 under the control of valve 132 and the second cam 158 of the timer.

Still proceeding from left to right, the third cam 160 of the timer controls the momentary application of power to the solenoid of valve 134 which admits pressure air to the cylinders 110 to reciprocate the assembly indexing bar 108 in a down-up movement, the duration of which is governed by the cam 160.

The fourth cam 162, as will be apparent from the electrical circuit diagram, provides the momentary blast of cooling air through either the front bank A or the rear bank B of anvils, depending upon the governing setting of the air-operated relay 148 by the alternate activation of the solenoid valves 144 and 146.

The fifth cam 164 and the sixth cam 166 respectively govern the position of that bank of anvils to which power is then routed by the position of the air-operated relay 148, the switch associated with cam 164 serving when closed to position the valves 136 or 138 to insert that bank of anvils to which power is routed by the relay 148, and the switch associated with the cam 166 serving when closed, in turn, to withdraw that same bank of anvils. It will be noted that the solenoids of each of the valves 136 and 138 are connected to the return side of the circuit through one of the sets of contacts of the air-operated relay 148 so that both sides of the line to the solenoids of each of the valves 136 and 138 are broken when such valve is de-activated by the air-operated relay.

A seventh cam 168 of the timer 150 momentarily activates its associated switch once during each revolution of the cycle timer 150 to energize a counter 170 to record the number of strips added to the assembly, and to light an indicator light to alert the operator that the required number of strips has been incorporated. If desired for the sake of fool-proof operation, the strip counter 170 might be assigned to the opening of a holding circuit of a relay (not shown) which might be substituted for the main circuit switch 172 to shut down the apparatus after the completion of each assembly of prescribed size so as to demand the operator's attention.

The eighth cam 174, activated at the conclusion of each cycle, just before the cycle timer motor is timed out by the opening of the switch 152, momentarily energizes the drive coil of the mechanical latch relay 142 to effect the energization of the opposite solenoid of the valve 140 to reverse the lateral indexing cylinder 100, and, in turn, to reverse the contacts of the air-operated slave relay 148, shifting the fastener heads 22 and the coil-positioning mechanism 24 for association with the alternate bank of anvils, i.e., the bank B in the assumed order of operation, and at the same time conditioning the directional contacts of the slave relay 148 to route power to the solenoids of those valves associated with the operation of the alternate bank of anvils.

For the initiation of each new spring assembly and for clearing each completed assembly from the assembly station of the apparatus, as well as for testing and maintenance, a number of manual switches is provided for the operation of selected circuit components. These include, again from left to right of the electrical circuit diagram, in its lower quadrant, a normally-open manual switch 176 to activate the valve 132 to lower the fastener heads 22, a set of two normally open switches 178 for the selective operation of the valve 138 to move the rear bank B of anvils in and out as required, and a similar set of two normally open switches 180 for the operation of the control valve 136 for similarly positioning the front bank A of anvils at will. Similarly, the lateral indexing of the fastener heads 22 and the coil positioning mechanism 24 may be effected manually by a normally open switch 182 which is connected to override the switch operated by the cam 174 of the cycle timer for lateral indexing out of normal cycle when such may be described.

The control circuit is fused in conventional manner and provided with separate indicator lights 184 and 186 which respectively signal that the circuit as a whole is energized, and that the drive motor of the cycle timer 150 is actually in operation.

Variations From The Disclosed Embodiment

It is contemplated that the feeding of each new strip of coils may in future be performed mechanically, as distinguished from manually, and that the means for positioning each new strip of pocketed springs in registry with its predecessor may assume a different form.

For example, with each new successive strip of springs laid upon the predecessor row, the descending fastening heads 22, upon entering the crevices between adjacent springs of the new strip, may bring the new strip into registry with its predecessor as the fastening heads proceed toward contact with their respective anvils. Accordingly, by appropriate coordination of the application of power to the cylinder 102 controlling the descent of the fastener heads, to the fastener heads themselves, and to the respective air cylinders 46 and 48 controlling the movement of the anvils, the anvils may be retracted and the downward movement of the fastener heads resumed to index the construction sufficiently for the emplacement of a new strip of springs.

As earlier indicated, such alternatives for the indexing of the construction are more suited to a fully automatic operation, whereas the spring strip positioning mechanism 24 for holding the new strip of springs in registry with its predecessor has been found well suited to a hand-fed semi-automatic operation.

The Modification Of FIG. 14 To FIG. 17 Inclusive

FIG. 14 illustrates the modified form in a side elevation comparable to that of FIG. 2 of the originally-disclosed form, to which it should be compared for a quick appreciation of the differences.

The modified apparatus of FIG. 14 et seq. is simpler in two aspects than that of FIGS. 1 to 12.

Most obviously, the pair of spaced fastening heads 22 at each sealing location in the first form of the apparatus is replaced by a single fastening head 222, positioned centrally of the spring coil height in the modified form.

Secondly, whereas the ultrasonic fastening heads 22 of the original form of the apparatus were each fixed to the carriage plate 96, and were moved vertically en masse into and out of sealing engagement with the anvils 20 by the plate 96 reciprocating upon the vertical shafts 92 under the driving force of the single cylinder 102, the modified mechanism eliminates the vertical movement of the otherwise corresponding carriage plate 296. Instead, each of the fastening heads 222 is moved into engagement with the cooperating anvils 220 under the driving force of its own cylinder 302, each subassembly of fastening head 222 and drive cylinder 302 being separately mounted upon the vertically immovable plate 296 of the laterally shiftable indexing carriage 284. This arrangement, together with other more detailed changes, provides greater assurance of a uniform and controllable fastening pressure which, in the apparatus of FIGS. 1 to 12, required precise positioning and adjustment of the fixed mountings of the individual ultrasonic fastening heads 22 in the vertically movable carriage plate 96.

Those two more obvious differences are accompanied by other less obvious improvements which will become evident from the following detailed description of the modification.

Detailed Description Of The Modification

Referring particularly to FIG. 14 for orientation, the modified apparatus is similarly mounted upon upper and lower cross beams 234 and 236 respectively, which span the frame standards at opposite sides of the apparatus. The assembly station 218 is similarly formed of two laterally elongated plates, a front plate 240 and a rear plate 242, each positioned vertically, and spaced apart from front to rear of the apparatus so as to form an upwardly and downwardly open box structure with the sideplates 244, by which the assembly station 218 is suspended from the lower cross beam 236.

As with the assembly station 18 of the earlier-disclosed form of the apparatus, the front and rear plates 240 and 242 are penetrated by probe-like anvils 220, which are inserted into and withdrawn from the assembly station 218 by air cylinders which are omitted from the drawing of FIG. 14, but are identical to those of the form of the apparatus disclosed in FIGS. 1 to 12.

The upper and lower cross beams 234 and 236 are spanned vertically by two short column sections 237 which support upper and lower horizontal cross shafts 286 clamped in split brackets 287 bolted to the front faces of the columns 237. The two shafts 286, in turn, support the laterally shiftable carriage 284 comprising the laterally elongated plate member 296 mounted on the shafts 286 by means of anti-friction slide bearings 288 bolted to the rear face of the plate. In any convenient way, as by means of an air cylinder 300 secured to the front face of the upper cross beam 234, with its piston connected to an angle bracket upstanding from the carriage plate 296, the carriage is indexed laterally to shift the fastening heads 222 between positions of alignment first with one of the two banks of anvils and then with the other, as described in connection with the earlier embodiment.

Each of the fastening heads 222 is held in upright position in a mounting block 298 bolted to the piston rod of an air cylinder 302 mounted vertically at the upper edge of the carriage plate 296. Each fastening head comprises an upper transducer 225 adapted to be connected by means not shown to a suitable source of high-frequency electrical energy. Extending downwardly from the transducer is a mechanical vibration amplifier or amplitude "booster" 227 from which, in turn, extending farther downwardly, is the vibrating horn 229 whose lower edge presses the pocket sheeting against the upper surface of the anvil 220 to form a weld by the vibrational energy of the horn.

Flanking the vibrating horn 229 fore and aft is a pair of guide rods 314, the lower ends of which are milled to blade-like edges of thickness comparable to the tip of the horn 229 to assist the vibrating horn on its passage into the crevice between two adjacent coils, and to assist in positioning that web upon the corresponding web of the underlying strip of coils for the making of the weld against the anvil 220.

The guide rods 314 are suspended rigidly from the mounting block 298 on U-shaped saddle brackets 315 which are so shaped to provide clearance for the resilient mounting of the vibrating sealing horn.

The resilient mounting of the horn 229 is better shown by FIGS. 16 and 17 from which it will be seen that the vibration amplifier 227 of the fastening head 222 includes a cylindrical mounting section 231 which is held in a split clamping ring 233 immediately below, but spaced from the mounting block 298. The clamping ring is suspended from the mounting block on four equispaced shoulder screws 235 passed through mating holes in the ring and screwed into the underside of the mounting block. Each screw is surrounded by a compression spring, the lower end of which is seated in a counter-bore in the clamping ring. The upper end of the cylindrical mounting section of the amplifier is received in a slightly larger vertical bore 237 in the mounting block 298, which serves as a guide bearing to stabilize the vertical movement of the fastening head permitted by the resilient mounting.

In the arrangement shown, i.e., with guide rods 314 flanking the blade edge of the sealing horn 229, the sealing horn preferably extends beyond the edges of the guide rods by approximately one-sixteenth of an inch to assure its seating in sealing arrangement with the interpocket web of the upper spring strip before the tips of the guide rods bottom on the anvil.

In the particular configuration shown, the length of the sealing edge of the vibrating horn is approximately two inches for a pocketed-spring coil height of five inches. For longer seals, I have employed vibrating horns of up to four inches in length of sealing edge, in which case the flanking guide rods 314 are omitted as the longer edge stabilizes and positions each pair of coils as it descends between them.

As earlier pointed out, the separate air cylinder drive for each fastening head 222 and the slight retractability of the spring-loaded mounting of the fastening head in the piston-driven mounting block 298 eliminate the need for the meticulous adjustment required with the rigid gang mounting of the fastening heads 22 of the earlier form of the apparatus in which all fastening heads were moved up and down en masse by the single drive cylinder 102. Nevertheless, in order to assure movement of all of the fastening heads in reasonable unison, the mounting blocks of the several fastening heads arrayed across the front face of the carriage plate 296 are joined together by a metal rod which passes with a loose fit through a lateral hole in the rear of each mounting block 298.

It should also be pointed out that the resilient mounting of the individual fastening heads 222 to the mounting blocks 298 is of little significance when the flanking guide rods 314 are eliminated for the use of the wider sealing horn. With adequate stroke of the piston of cylinder 302, each sealing horn is resiliently urged against its cooperating anvil by the air pressure in its associated drive cylinder, the stroke of which is adequate to compensate for any minor misalignment which may occur in either of the bank of anvils 222.

It will also be noted by comparison of FIGS. 14 and 2 that the cross bar 108 of the positioning and indexing mechanism 24, located between the pairs of fastening heads 22 in FIG. 2, is moved rearwardly of the fastening head 222, in the modified form of FIG. 14. Further differentiating the latter, as best seen from the front in FIG. 15, the U-shaped locator fingers 112 of the earlier form are equipped with sole plates 313 in the modified form, and those plates in the upward or retracted position of the indexing mechanism, as for the loading of a new row of coils to be joined to the assembly, are located well above the tips of the sealing horns 229. That is to say, whereas the U-shaped locator fingers 112 of the original form of indexing mechanism served to position the new row of coils for the descent of the fastening heads 22, as well as to index that row downwardly later after that row was joined to the assembly, the coil-positioning function in the modified apparatus is performed by the sealing horns 229 and their flanking guide rods 314, or by the sealing horns alone in its wider version in which the flanking guide rods are eliminated.

This transfer of function permits the enhancement of the effectiveness of the indexing mechanism by the addition of the sole plates 313. Their function is specifically illustrated by the dotted line configuration at the bottom of FIG. 15, showing the sold plates 313 of the indexing mechanism seating the last-joined strip of coils solidly upon the anvils 220 on either side of the central anvil on which the previous connection of the coil strips was made. As will be seen from FIG. 15, each sole plate 313 of the indexing mechanism spans the two coils which are forced downwardly onto the alternate bank of anvils after the central anvil is withdrawn following the making of the previous seal, as at 14. This broader configuration of the pushing element of the indexing mechanism not only assures the seating of adjacent pairs of coils onto the alternate bank of anvils, it rotates those coils sufficiently downwardly about their points of suspension on those alternate anvils to permit the ready reinsertion of the intervening central anvil with greater clearance than was the case with the prior indexing mechanism, and consequently with less opportunity to snag the spring pocket material by the reinsertion of the anvils.

The circuit diagrams of FIG. 13 are equally applicable to the modified apparatus by the substitution of multiple and manifolded vertical drive cylinders 302 for the single cylinder 102, and the elimination of one of the ultrasonic frequency generators 104 at each sealing location.

The features of the invention believed new and patentable are set forth in the following claims.

What is claimed is:

1. Apparatus for making an assembly of strips of pocketed upholstery coil springs as a spring core for a mattress or cushion or the like by joining successive strips of such springs to each other seriatim, comprising,
   a support defining an assembly station,
   a series of probe-like anvils arrayed in a line on said support and spaced from one another so as to engage a strip of said pocketed springs in said assembly station between two adjacent springs at intervals along said strip,
   a series of fastening heads each movably mounted on said support for movement into and out of engagement with one of said anvils and normally spaced therefrom a distance sufficient for the placement of two strips of pocketed springs between said anvils and associated fastening heads, with the intercoil webs of the pocket material of the two successive strips aligned in the paths of movement of said fastening heads to said anvils,
   and means for moving the fastening heads into and out of fastening cooperation with said anvils to fasten said new strip to the preceding strip between adjacent coils of each of said two strips.

2. The apparatus of claim 1 in which said anvils are axially retractable from and insertable into said assembly station, means are provided to retract and to reinsert the anvils after each strip is joined to the assembly, and the apparatus includes an assembly indexing mechanism to advance the assembly the width of one spring strip in a direction perpendicular to the line of anvils between the retraction and reinsertion of said anvils.

3. The apparatus of claim 2 in which the anvils are associated as two groups each comprising alternate anvils of the line of anvils, each anvil being spaced from each adjacent anvil of its group by an interval of at least two springs along said strip of springs, the fastening heads are indexable in a direction parallel to said line of anvils to alternate the engagement of the fastening heads between the two anvil groups, the means provided to retract and to reinsert said anvils are power-operated and provided separately for each anvil group, separate power means for indexing the fastening heads, for moving the fastening heads into and out of engagement with the anvils and for operating the assembly indexing mechanism, and sequence control means to activate said power and power-operated means to move the fastening heads into and out of engagement with said anvils, to thereafter withdraw the bank of anvils so engaged from the assembly station, to operate the assembly indexing mechanism to advance the assembly to position the same against the alternate bank of anvils, to reinsert the first-mentioned bank of anvils, and to index the fastening heads for subsequent engagement with the alternate bank of anvils, said assembly indexing means being engageable at least alternately with the group of anvils not engaged by the fastener heads.

4. The apparatus of claim 3 in which the inter-anvil space within each anvil group will receive two springs of such strip.

5. The apparatus of claim 3 in which the anvils when inserted span the assembly station and are supported from both ends of their respective spans, and the two groups of anvils are inserted from opposite directions.

6. The apparatus of any of the preceding claims in which each fastening head is an ultrasonic probe insertable into the valley between the converging outlines of the enclosing pockets of adjacent coils of each new strip to intercept the inter-coil web of said strip and to press said web and the like web of the previously connected strip together against an anvil to connect the two strips together.

7. The apparatus of claim 3 in which the assembly station is defined between two vertical plates from which the anvils when inserted protrude in a horizontal line to a supporting hole in the opposite plate to span the plates, each new strip of springs being laid horizontally in said station from which the assembly issues downwardly one strip width at a time with each successive operation of the indexing mechanism, the spring assembly being suspended at all times by at least one group of anvils during the making of the spring assembly.

8. The apparatus of claim 3 in which the power means for moving the fastener heads into and out of engagement with the anvils is a separate power means for each fastener head.

9. The apparatus of claim 3 in which each fastener head is an ultrasonic probe insertable into the valley between the converging outlines of the enclosing pockets of adjacent coils of each new strip to intercept the inter-coil web of said strip and to press said web and the like web of the previously connected strip together against an anvil to connect the two strips together, and said probes are separately mounted for individual resilient engagement with said anvils.

* * * * *

UNITED STATES PATENT AND TRADEMARK OFFICE
CERTIFICATE OF CORRECTION

PATENT NO. : 4,401,501
DATED : August 30, 1983
INVENTOR(S) : Walter Stumpf

It is certified that error appears in the above-identified patent and that said Letters Patent is hereby corrected as shown below:

In the Abstract, line 1, "assemblies" should read --assembles--.

Column 4, line 64, "eacn" should read --each--.

Column 6, line 29, "wih" should read --with--.

Column 9, line 9, "the" (first occurrence) should read --that--.

Column 11, line 8, "can" should read --cam--.

Column 12, line 13, "described" should read --desired--.

Column 15, line 23, "sold" should read --sole--.

Signed and Sealed this

Twentieth Day of December 1983

[SEAL]

Attest:

GERALD J. MOSSINGHOFF

Attesting Officer

Commissioner of Patents and Trademarks